US008655648B2

(12) United States Patent
Kulkarni et al.

(10) Patent No.: US 8,655,648 B2
(45) Date of Patent: Feb. 18, 2014

(54) IDENTIFYING TOPICALLY-RELATED PHRASES IN A BROWSING SEQUENCE

(75) Inventors: Chinmay Eishan Kulkarni, Bangalore (IN); Uppinakuduru Raghavendra Udupa, Bangalore (IN); Santosh Raju Vysyaraju, Bangalore (IN); Ajay S. Manchepalli, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/873,660

(22) Filed: Sep. 1, 2010

(65) Prior Publication Data

US 2012/0053927 A1    Mar. 1, 2012

(51) Int. Cl.
*G06F 17/27*    (2006.01)

(52) U.S. Cl.
USPC ...... 704/9; 704/1; 704/10; 707/706; 707/707; 707/708; 707/721; 715/254; 715/255

(58) Field of Classification Search
USPC .................. 704/1, 9, 10; 707/706–708, 721; 715/254, 255
See application file for complete search history.

(56) References Cited

U.S. PATENT DOCUMENTS

| | | | | |
|---|---|---|---|---|
| 5,893,916 A * | 4/1999 | Dooley | ......................... | 715/234 |
| 6,356,898 B2 * | 3/2002 | Cohen et al. | ......................... | 1/1 |
| 6,658,626 B1 * | 12/2003 | Aiken | ......................... | 715/205 |
| 7,296,016 B1 * | 11/2007 | Farach-Colton et al. | ............. | 1/1 |
| 7,702,635 B2 | 4/2010 | Horvitz et al. | | |
| 7,702,683 B1 * | 4/2010 | Kirshenbaum | ............... | 707/758 |
| 7,739,295 B1 * | 6/2010 | Agrawal et al. | ............... | 707/768 |
| 7,904,443 B2 * | 3/2011 | Neuneier et al. | ............... | 707/709 |
| 7,917,299 B2 * | 3/2011 | Buhler et al. | ..................... | 702/19 |
| 7,979,439 B1 * | 7/2011 | Nordstrom et al. | ........... | 707/741 |
| 8,209,616 B2 * | 6/2012 | Stefik et al. | ..................... | 715/744 |
| 2001/0044795 A1 * | 11/2001 | Cohen et al. | ....................... | 707/5 |
| 2005/0033771 A1 * | 2/2005 | Schmitter et al. | .......... | 707/104.1 |
| 2005/0086219 A1 * | 4/2005 | Martin | ............................. | 707/3 |
| 2005/0192948 A1 * | 9/2005 | Miller et al. | ...................... | 707/3 |
| 2006/0018506 A1 * | 1/2006 | Rodriguez et al. | ............ | 382/100 |
| 2006/0018551 A1 * | 1/2006 | Patterson | ...................... | 382/229 |
| 2006/0020571 A1 * | 1/2006 | Patterson | ......................... | 707/1 |
| 2006/0020607 A1 * | 1/2006 | Patterson | ..................... | 707/100 |
| 2006/0031195 A1 * | 2/2006 | Patterson | ......................... | 707/3 |

(Continued)

OTHER PUBLICATIONS

Barrett et al., How to Personalize the Web, 1997, CHI '97 Proceeding of the ACM SIGCHI Conference on Human factors in computing systems, pp. 75-82.*

(Continued)

*Primary Examiner* — Lamont Spooner
(74) *Attorney, Agent, or Firm* — Steve Wight; Carole Boelitz; Micky Minhas (57) ABSTRACT

Browsing sequence phrase identification technique embodiments are presented that generally extract topically-related phrases from the pages visited by a user in a browsing session. The topically-related phrases can be used for a variety of purposes, including aiding a user in re-finding previously visited sites. This phrase identification task is performed by considering not just the pages of a user's browsing sequence individually, but also pages visited immediately before and immediately after each page. In this way, phrases found in a page can be analyzed in the context in which the page was viewed, rather than in isolation. The identified phrases are further filtered by picking those that appear on a pre-populated topic list, and then clustering to find the most informative ones.

13 Claims, 10 Drawing Sheets

(56) References Cited

U.S. PATENT DOCUMENTS

| | | | |
|---|---|---|---|
| 2006/0106792 A1* | 5/2006 | Patterson | 707/5 |
| 2006/0294155 A1* | 12/2006 | Patterson | 707/200 |
| 2007/0156732 A1* | 7/2007 | Surendran et al. | 707/101 |
| 2008/0306943 A1* | 12/2008 | Patterson | 707/6 |
| 2008/0319941 A1* | 12/2008 | Gollapudi | 707/2 |
| 2008/0319971 A1* | 12/2008 | Patterson | 707/5 |
| 2009/0006974 A1* | 1/2009 | Harinarayan et al. | 715/738 |
| 2009/0012944 A1* | 1/2009 | Rodriguez et al. | 707/3 |
| 2009/0070312 A1* | 3/2009 | Patterson | 707/5 |
| 2009/0204573 A1* | 8/2009 | Neuneier et al. | 707/3 |
| 2009/0228357 A1* | 9/2009 | Turakhia | 705/14 |
| 2009/0248678 A1* | 10/2009 | Okamoto et al. | 707/5 |
| 2009/0319940 A1* | 12/2009 | Flake et al. | 715/781 |
| 2009/0327913 A1 | 12/2009 | Adar et al. | |
| 2010/0030773 A1* | 2/2010 | Patterson | 707/5 |
| 2010/0058195 A1* | 3/2010 | Stefik et al. | 715/744 |
| 2010/0161625 A1* | 6/2010 | Patterson | 707/754 |
| 2010/0169305 A1* | 7/2010 | Patterson | 707/728 |
| 2010/0205541 A1* | 8/2010 | Rapaport et al. | 715/753 |
| 2011/0082825 A1* | 4/2011 | Sathish et al. | 706/46 |
| 2011/0113349 A1* | 5/2011 | Kiciman et al. | 715/753 |
| 2011/0131223 A1* | 6/2011 | Patterson | 707/758 |
| 2011/0145160 A1* | 6/2011 | Hajiaghayi et al. | 705/319 |
| 2011/0191098 A1* | 8/2011 | Thomas et al. | 704/9 |
| 2012/0030018 A1* | 2/2012 | Passmore et al. | 705/14.52 |

OTHER PUBLICATIONS

Chirita, P.-A., C. S. Firan, W. Nejdl, Summarizing local context to personalize global web search, Proc. of the 2006 ACM CIKM Int'l Conf. on Info. and Knowledge Management, pp. 287-296, No. 6-11, 2006, Arlington, Virginia, USA.

Dhillon, I. S., Co-clustering documents and words using bipartite spectral graph partitioning, pp. 269-274, Proc. of the Seventh ACM SIGKDD Int'l Conf. on Knowledge Discovery and Data Mining, Aug. 26-29, 2001, San Francisco, CA, USA.

Fallows, D., Search engine users, Pew / Internet, Jan. 23, 2005, retrieved from http://www.pewintemet.org/~/media//Files/Reports/2005/PIP_Searchengine_users.pdf.pdf.

Mahmud, J., Y. Borodin, I. V. Ramakrishnan, Csurf: A context-driven non-visual web-browser, Proc. of the 16th Int'l Conf. on World Wide Web, pp. 31-40, May 8-12, 2007, Banff, Alberta, Canada.

Mohomed, I., J. C. Cai, S. Chavoshi, E. de Lara, Context-aware interactive content adaptation, Proc. of the 4th Int'l Conf. on Mobile Systems, Applications, and Services (MobiSys 2006), pp. 42-55, Jun. 19-22, 2006, Uppsala, Sweden.

Pedersen, E. R., K. Gyllstrom, S. Gu, P. J. Hong, Automatic generation of research trails in web history, Proc. of the 2010 Int'l Conf. on Intelligent User Interfaces, pp. 369-372, Feb. 7-10, 2010, Hong Kong, China.

Rizzo, F., F. Daniel, M. Matera, S. Albertario, A. Nibioli, Evaluating the semantic memory of web interactions in the xMem project, Proc. of the Working Conf. on Advanced Visual Interfaces, pp. 185-192, May 23-26, 2006, Venezia, Italy.

Teevan, J., C. Alvarado, M. S. Ackerman, D. R. Karger, The perfect search engine is not enough: A study of orienteering behavior in directed search, Proc. of the 2004 Conf. on Human Factors in Computing Systems, pp. 415-422, Apr. 24-29, 2004, Vienna, Austria.

Won, S. S., J. Jin, J. I. Hong, Contextual web history: using visual and contextual cues to improve web browser history, Proc. of the 27th Int'l Conf. on Human Factors in Computing Systems, pp. 1457-1466, Apr. 4-9, 2009, Boston, MA, USA.

\* cited by examiner

IDENTIFYING TOPICALLY-RELATED PHRASES IN A BROWSING SEQUENCE

BACKGROUND

The Internet is a global data communications system that serves billions of users worldwide. The Internet provides users access to a vast array of information resources and services, including those provided by the World Wide Web, intranet-based enterprises, and the like. Typically, a user navigates from one page associated with a URL to another using a browser program. The period of time that a user spends in this navigation is called a browsing session. In addition, the order in which pages are visited during a browsing session can be called a browsing sequence.

Internet users often revisit pages, both to obtain updated information and to re-visit information they have seen before. It is conservatively estimated that users revisit nearly half of all pages they see. Navigation aids that assist a user in re-finding previously visited site can be quite useful.

SUMMARY

The browsing sequence phrase identification technique embodiments described herein generally extract topically-related phrases from the pages visited by a user in a browsing session. These topically-related phrases that can be used for a variety of purposes, including aiding a user in re-finding previously visited sites. This phrase identification task is performed by considering not just the pages of a user's browsing sequence individually, but also pages visited before and after each page. In this way, phrases found in a page can be analyzed in the context in which the page was visited, rather than in isolation. The identified phrases are further filtered by picking those that appear on a pre-populated topic list, and then clustering to find the most relevant ones.

In one general embodiment, the foregoing is accomplished by first scanning content elements in multiple pages of a user's browsing sequence to identify one or more candidate phrases that are also present in a prescribed phrase list. Then, phrases found on the pages having at least one candidate phrase are co-clustered to produce a set of one or more topically-related phrases.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of browsing sequence phrase identification technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Browsing Sequence Phrase Identification

A topically-related phrase is a multi-word term that captures the essence of the topic of a document, which can be a page visited in a browsing session. Given a set of pages that are related to a common topic, it is likely that topical phrases appear in more than one of the pages. In addition, it is likely that these topical phrases co-occur between documents more than non-topical phrases. In view of the foregoing, it is possible to extract phrases from the set of related pages which are closely related to the topic of these pages.

The extraction of topically relevant phrases from a user-generated browsing sequence is useful for a variety of applications. For example, topically-related phrases can be used to improve existing browsing history functionality, or as part of a search engine intervention that suggests pages from the user's browsing history that are related to the current search terms.

The browsing sequence phrase identification technique embodiments described herein generally extract the aforementioned topically-related phrases from the pages visited by a user in a browsing session. This task is performed by considering not just the pages of a user's browsing sequence individually, but also pages visited immediately before and immediately after each page. In this way, phrases found in a page can be analyzed in the context in which the page was viewed, rather than in isolation. This aids in identifying phrases that are topically related to the content of the pages visited in the browsing sequence. The identified phrases can be further filtered by picking those that appear on a pre-populated topic list, and then clustering to find the most informative ones. It is noted the aforementioned browsing sequence can be taken from a stored browsing history or the sequence can be accessed in real time as a user is browsing.

Figure 1:
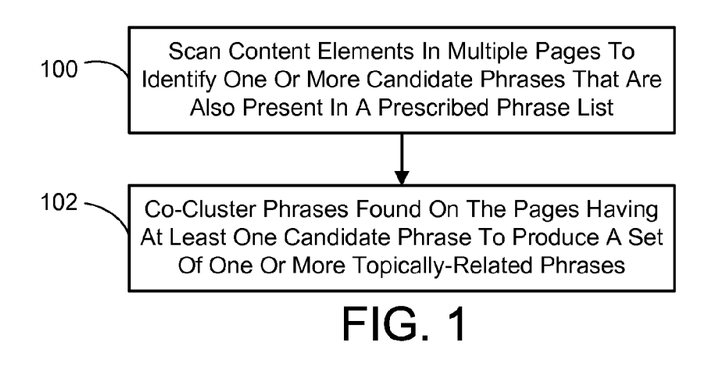
FIG. 1 is a flow diagram generally outlining one embodiment of a process for identifying topically-related phrases in a browsing sequence.

In one general embodiment, the foregoing is accomplished as follows. Referring to FIG. 1, topically-related phrases are identified in a browsing sequence by first scanning content elements in multiple pages of a user's browsing sequence to identify one or more candidate phrases that are also present in a prescribed phrase list (100). Phrases found on the pages having at least one candidate phrase are then co-clustered to produce a set of one or more topically-related phrases (102).

Figure 2:
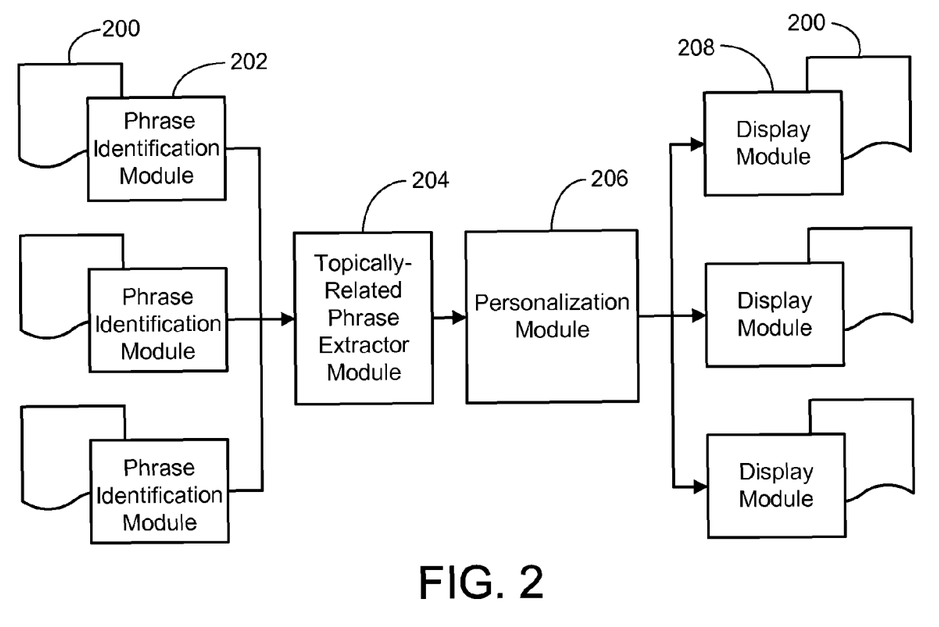
FIG. 2 is a simplified architectural block diagram showing the modules employed for identifying topically-related phrases in a browsing sequence, including a module for re-ranking the topically-related phrases based on a user's browsing history and modules for presenting the phrases to the user.

It is noted that all the topically-related phrases produced in the co-clustering could be presented to the user. Alternately, the topically-related phrases that pass a prescribed quality threshold could be presented to the user. With regard to this latter alternative, in one implementation, the aforementioned co-clustering procedure ranks the topically-related phrases that are found and associates a ranking score with each phrase. This implementation facilitates an optional action of re-ranking the ranking scores produced in the co-clustering based on the frequency of occurrence of the phrase in the user's browsing history. These ranked topic phrases, or a prescribed number of the top ranking phrases can then be presented to the user. FIG. 2 illustrates how these additional features can be implemented. A set of consecutive pages 200 are taken from a user's browsing sequence (three of which are shown) and candidate phrase identification modules 202 are used to identify one or more candidate phrases as described above from each page 200. A topically-related phrase extractor module 204 is then employed to produce a set of one or more ranked topically-related phrases from the pages found to have at least one candidate phrase. As indicated above this is accomplished using a co-clustering procedure. Each topically-related phrase and its rank are associated with the pages containing the phrase. These topically-related phrases are then re-ranked based on the user's browsing history as described previously using a personalization module 206. The re-ranked phrases are then provided to the user. In one exemplary implementation shown in FIG. 2, the ranked topically related phrases are displayed to a user in conjunction with the page 200 they are associated with via a set of display modules 208.

It is noted that a user's browsing session can produce a long browsing sequence made up of many pages. However, typically only shorter sequences of these pages are related to a particular topic. Thus, considering long sequences of pages when extracting topically-related phrases could produce unsatisfactory results. To avoid this possibility, in one embodiment, a smaller segment of the browsing sequence is considered in an iteration of the browsing sequence phrase identification technique, with multiple iterations being performed to analyze the browsing sequence as a whole. In general, for each iteration, the sequence of pages considered will have a minimum number of pages and up to a maximum number of pages. The minimum number of pages is needed to ensure there is enough data to find topically-related phrases, and a maximum number of pages is established to aid in ensuring the pages considered are topically related in some way.

Figure 3:
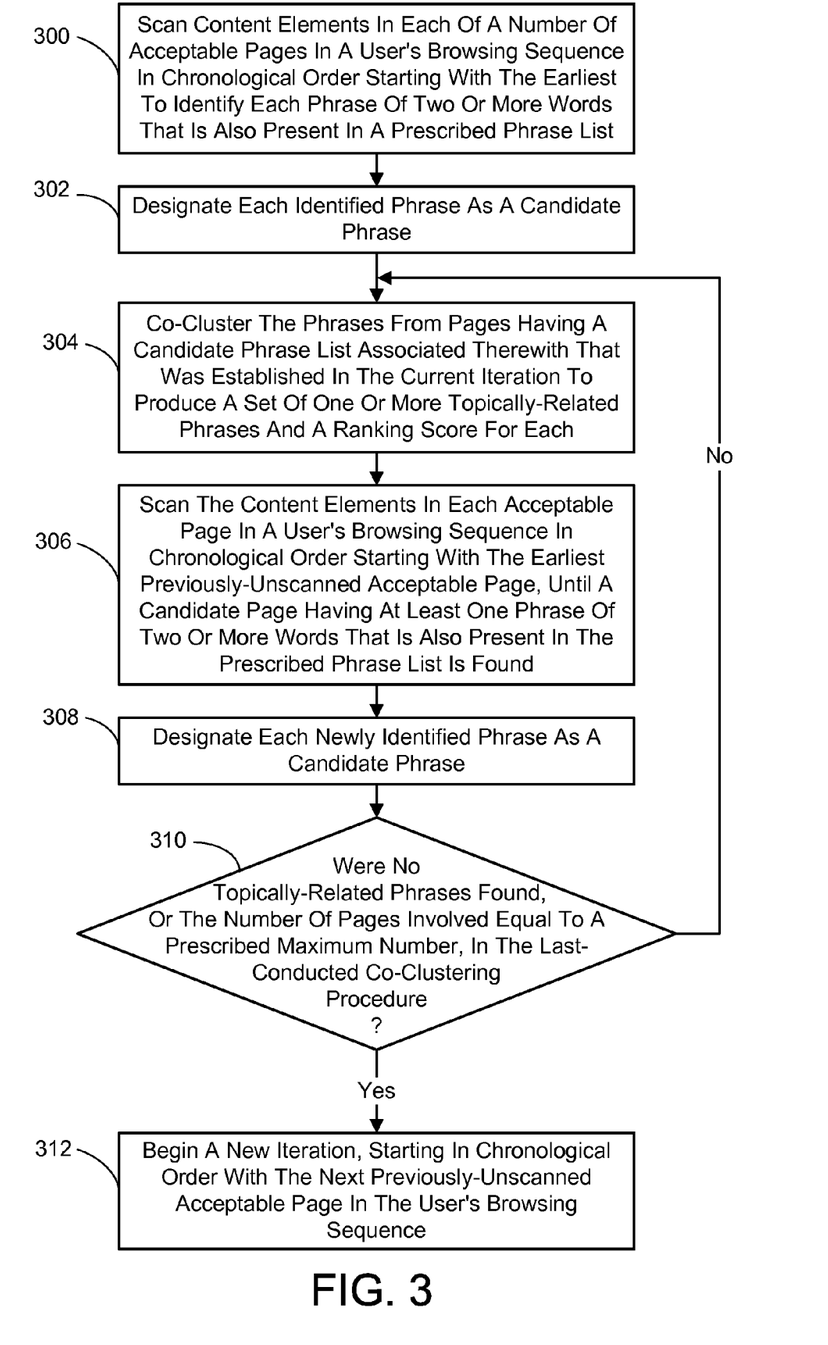
FIG. 3 is a flow diagram generally outlining one embodiment of a process for identifying topically-related phrases in a browsing sequence, which, for each iteration of the process, uses a sub-sequence of the user's browsing sequence having a minimum number of pages and up to a maximum number of pages.

In one general implementation, the foregoing is accomplished as follows. Referring to FIG. 3, topically-related phrases are identified in a browsing sequence for each iteration by first scanning content elements in each of a number of acceptable pages in a user's browsing sequence in chronological order starting with the earliest acceptable page found in the sequence to identify each phrase of two or more words that is also present in a prescribed phrase list (300). It is noted that while the use of two or more word phrases was found to produce good results, the present technique is not limited to this implementation. Rather, a phrase could have any prescribed minimum bound on the number of words, as well as optionally a prescribed maximum bound. A page is acceptable if it has not been designated as secured by the user. In addition, while all the non-secured pages can be considered, in one implementation, only pages having sufficient content are employed. Thus, an acceptable page can be further defined as one which has the number or types of content elements therein deemed sufficient to establish the page as a content page. These criteria will be discussed in more detail later in this description. In this implementation, the number of acceptable pages scanned equals the number that would produce a minimum number of pages having at least one of the identified phrases found therein. There are different ways to establish the minimum number of pages some of which will be described in more detail later.

Next, for each of the pages having at least one identified phrase, each identified phrase is designated as a candidate phrase to establish a candidate phrase list for the page (302). The phrases found on the pages having a candidate phrase list associated therewith that was established in the current iteration of the process are then co-clustered to produce a set of one or more topically-related phrases and a ranking score for each topically-related phrase—if any topically-related phrases are found (304). When a set of one or more topically-related phrases and a ranking score for each phrase is produced, the content elements in each acceptable page in a user's browsing sequence is scanned in chronological order starting with the earliest previously-unscanned acceptable page, until a candidate page having at least one phrase of two or more words (or some other length phrase if desired) that is also present in a prescribed phrase list is found (306). Then, each identified phrase is designated as a candidate phrase to establish a candidate phrase list for the candidate page (308). Process actions 304 and 306 are then repeated until no topically-related phrases are found in the last-conducted co-clustering procedure or the number of pages involved in the last-conducted co-clustering procedure equals a prescribed maximum number of pages (310). When either of these events occurs, a new iteration of the process is begun, starting in chronological order with the next previously-unscanned acceptable page in the user's browsing sequence (312).

The following sections will now provide a more detailed description of the features described in the foregoing general embodiments.

1.1 Parsing

As indicated previously, the content elements in each page of a user's browsing sequence are identified before candidate phrases can be found. In one implementation, this is accomplished by parsing the HTML source of a page to identify its content-rich parts. Elements on the page, such as headers, footers, navigational links, scripts and frames that enclose other pages contain little semantic information about the page content and so can be ignored. While any appropriate parser can be employed for the foregoing task, in one implementation a parser which removes elements in a conservative manner is used. This type of parser relies only on the HTML source of the page. Other linked resources, such as stylesheets and images are not included so that the parser can continue to run in the background without a large memory overhead.

For example, a parsing scheme which employs numeric and non-numeric factor testing to identify parsed elements that are probably content related and conservatively eliminating the rest, can be employed. In addition, the parsing scheme employed determines if the number or types of content elements are considered sufficient according to prescribed criteria, to establish a page as a content page. In one implementation, pages not deemed to be content pages are unacceptable and skipped. In addition, a user can designate a page as secured for privacy reasons. Such pages in the user's browsing sequence are also skipped.

In one implementation, the result of this parsing scheme is a single compact representation of elements representing the content of the parsed page (which will sometimes be referred to herein as a "content CR"). For instance, in one version, this takes the form of a concatenated plaintext representation of the content elements along with the title of the page. However, it is noted that the parsing procedure is not limited to representing the content CR in a concatenated form. Rather any form that allows for readily extractable test could be used.

It is noted that the accuracy of the aforementioned co-clustering procedure can be improved if some elements known not to be effective keywords are removed. In one implementation, these so-called stop words are identified using a pre-assembled dictionary of stop words, and then removed from the content CR. In an alternate implementation, the stop words are identified using a conventional stop word identification process.

1.2 Topic Phrase Validation

As indicated previously, the content elements found in acceptable pages are scanned to identify candidate phrases that are also found in a prescribed phrase list. In one implementation, the prescribed phrase list can be obtained from an on-line encyclopedia-type site (e.g., English (US) Wikipedia). Such sites are known to provide information on a diverse set of topics. Each article excluding category pages, help pages, and the like, provides information on a distinct concept. For example, in one implementation the titles of the articles are considered to be representative of their topic, and are used to construct the prescribed phrase list. However, it is not intended to limit the collection of phrases to just article titles. Other parts of an article, such as a keyword list, abstract, summary, and so on, could also be used. Using an exhaustive list of topics, such as derived from an on-line encyclopedia-type site is advantageous in that it ensures that the topic phrases are descriptive of the concept they represent, since they were created by humans for this exact purpose. However, it is noted that the topic phrase validation procedure is not limited to just the use of an on-line encyclopedia-type site. Rather, any source that would provide topic phrases that are descriptive of the concept they represent could be used.

It is noted that in one implementation, the prescribed phrase list is stored in a space-efficient form using a Bloom filter. Storing it in this form allows for efficient comparison to the content CR.

Figure 4A:
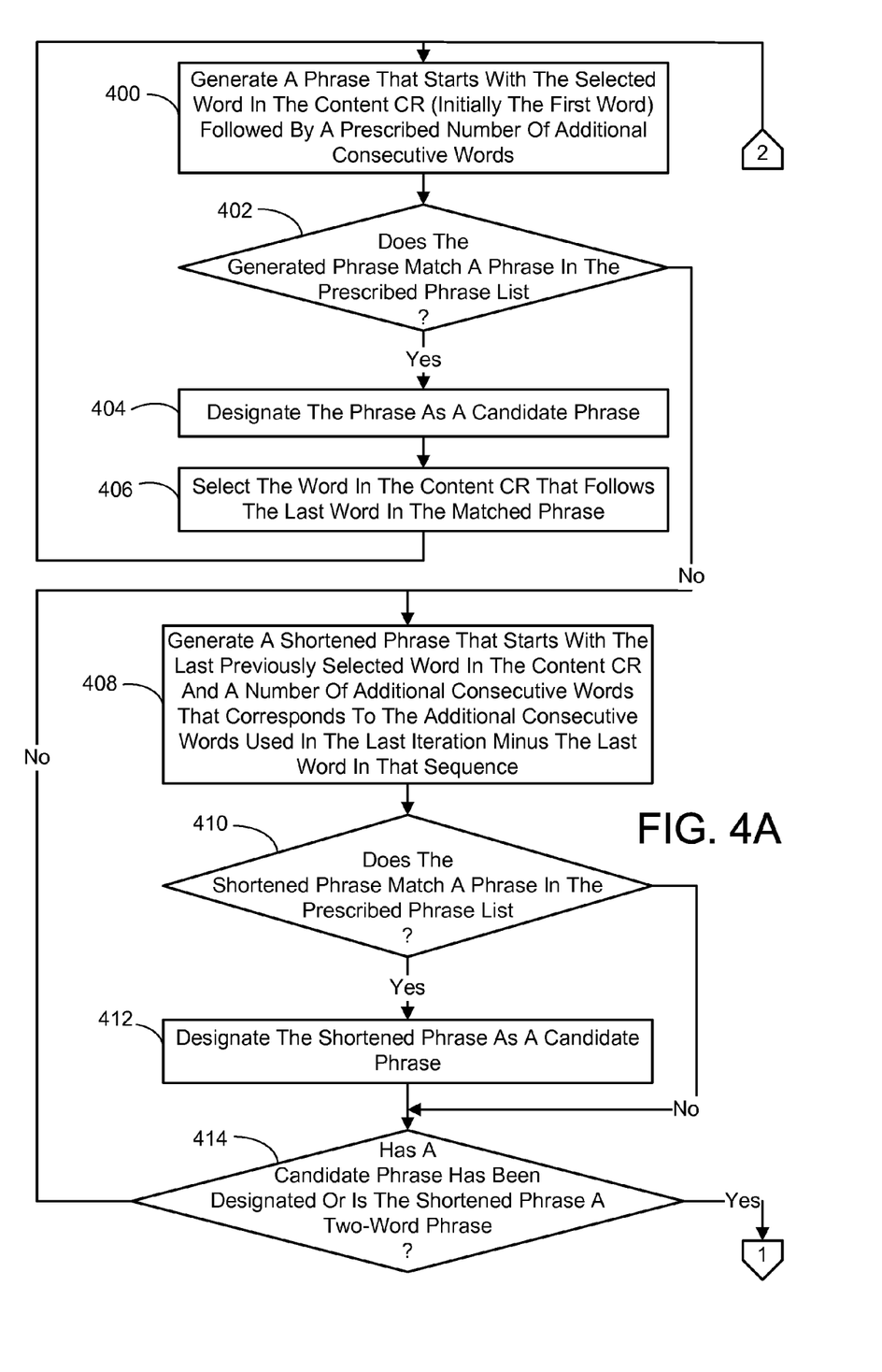
FIGS. 4A-B are a continuing flow diagram generally outlining an implementation of the part of the process of FIG. 1 or 3 involving identifying candidate phrases in a page of a user's browsing sequence.
Figure 4B:
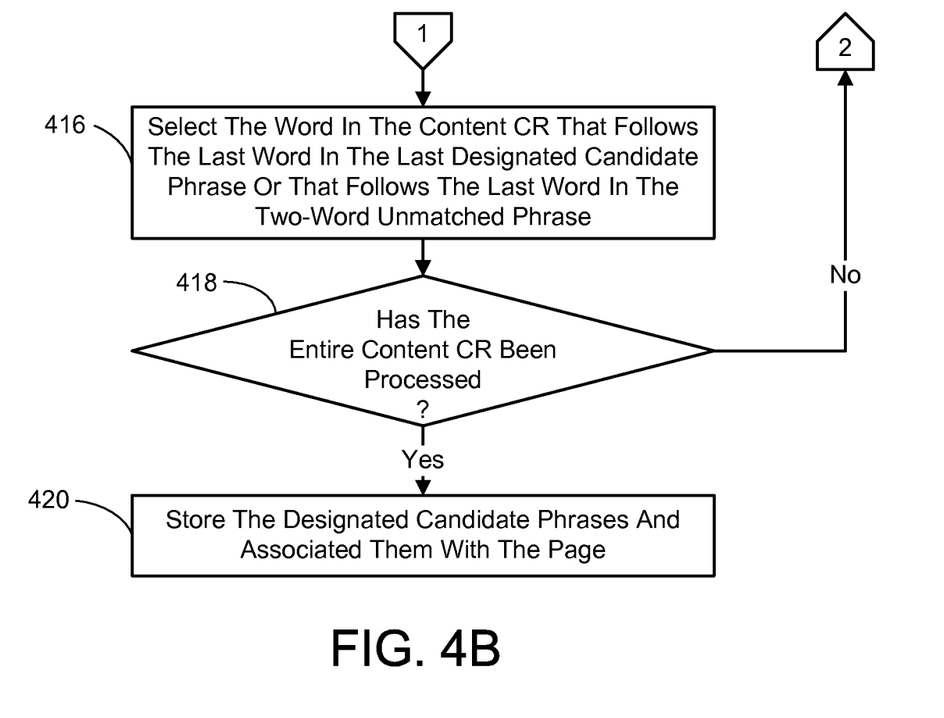

In view of the foregoing and referring to FIGS. 4A-B, in one implementation identifying candidate phrases in a page of a user's browsing sequence involves first generating a phrase that starts with a selected word in the content CR followed by a prescribed number of additional consecutive words (400). In a first iteration, the selected word is the first word found in the content CR. It is then attempted to match the generated phrase in the prescribed phrase list representation (402). If a match is found, then the phrase is designated as a candidate phrase (404), and the word in the content CR that follows the last word in the matched phrase is selected (406). Process actions 400 through 406 are then repeated starting with the newly selected word in the content CR. However, if a match is not found, a shortened phrase is generated that starts with the aforementioned selected word in the content CR and a number of additional consecutive words that corresponds to the additional consecutive words used in the last iteration minus the last word in that sequence (408). An attempt is then made to match the shortened phrase to the prescribed phrase list representation (410). If a match is found, then the phrase is designated as a candidate phrase (412). It is then determined if a candidate phrase has been designated or if the last iteration involved a two-word (or whatever length was employed) phrase (414). If neither has occurred, then process actions 408 through 414 are repeated. However, if either event has occurred, then the word in the content CR that follows the last word in the last designated candidate phrase or that follows the last word in the two-word unmatched phrase, as the case may be, is selected (416), and process actions 400 through 416 are repeated as appropriate. This process continues until it is determined the entire content CR has been processed in the manner described (418), at which time any candidate phrases that have been designated are stored and associated with the page (420).

The resulting list of candidate phrases can optionally be stemmed to facilitate the upcoming co-clustering procedure. To this end, for each candidate phrase, the stem of each word is used to replace the original word. In one implementation, this is accomplished using a standard stemming procedure, such as a Porter's stemmer.

1.3 Minimum and Maximum Number of Pages in an Iteration

In one implementation of the browsing sequence phrase identification technique where a sub-sequence of the user's overall browsing sequence is analyzed in each iteration, the sub-sequence has a minimum number of pages and can range up to a maximum number of pages. The maximum number of pages is prescribed. For example, in one version, the maximum number is 10-12. Other values for the maximum number of pages can be employed as desired, with a goal that they are short enough so that the sequence of pages is likely to encompass a single topic. It is noted that the sub-sequence can involve less that the maximum number of pages depending on the similarity of the pages, as will be described in more detail later.

Figure 5:
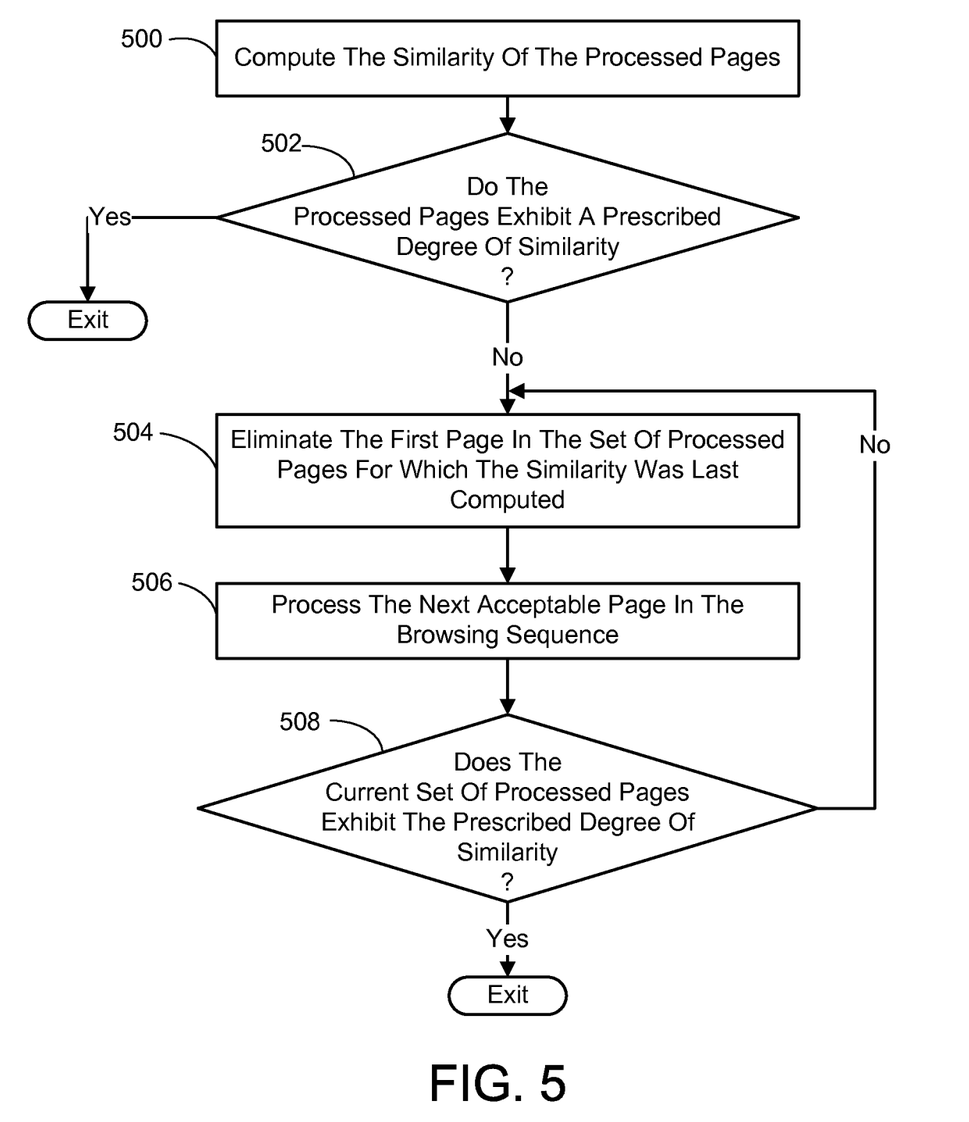
FIG. 5 is a flow diagram generally outlining an implementation of the part of the process of FIG. 3 involving accessing the similarity of the processed pages.

As for the minimum number of pages, in one implementation, the minimum number of pages is prescribed (e.g., 3 or 4 pages). However, in another implementation the similarity of the pages is considered in selecting what pages form the minimum number of pages. Referring to FIG. 5, in this second implementation, once a predefined number of pages are processed as described previously (e.g., 3 or 4 pages), the similarity of the processed pages is computed (500), and it is determined if the pages exhibit a prescribed degree of similarity (502). If the prescribed degree of similarity is found, then the procedure for obtaining the minimum number of pages having candidate phrase lists associated therewith ends. However, if the prescribed degree of similarity is not found, then the first page in the set of processed pages for which the similarity was last computed is eliminated (504), the next acceptable page in the browsing sequence is processed as described previously (506), and process actions 504 through 506 are repeated as appropriate until it is determined the current set of processed pages is found to exhibit the prescribed degree of similarity (508), at which time the procedure for obtaining the minimum number of pages having candidate phrase lists associated therewith ends. In one version, the similarity of the processed pages is determined using a measure of similarity such as a conventional cosine similarity procedure, and the degree of similarity is assessed by determining if a resulting similarity value is less than a prescribed similarity threshold. If so, it is deemed that the current set of pages is not similar enough.

1.4 Co-Clustering

As indicated previously, the pages of the user's browsing sequence that have a candidate phrase list associated therewith in the current iteration of the process are co-clustered. Any appropriate co-clustering procedure can be employed as long as it results in a set of topically-related phrases, and in one implementation a ranking score for each phrase, or an indication that there are no topically-related phrases among the set of pages co-clustered.

1.5 Exemplary Process

Figure 6A:
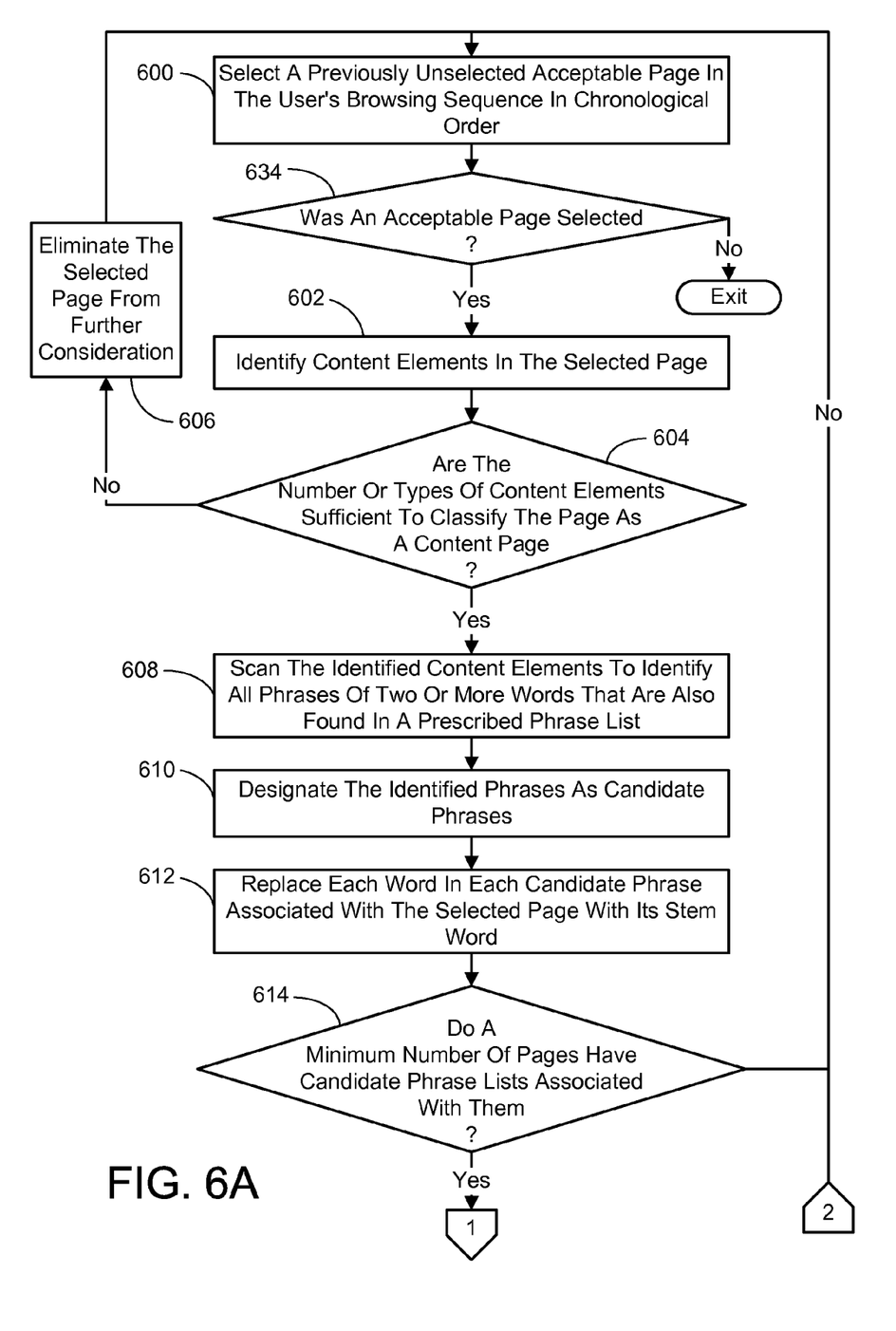
FIGS. 6A-B are a continuing flow diagram generally outlining one embodiment of a more comprehensive process for identifying topically-related phrases in a browsing sequence.
Figure 6B:
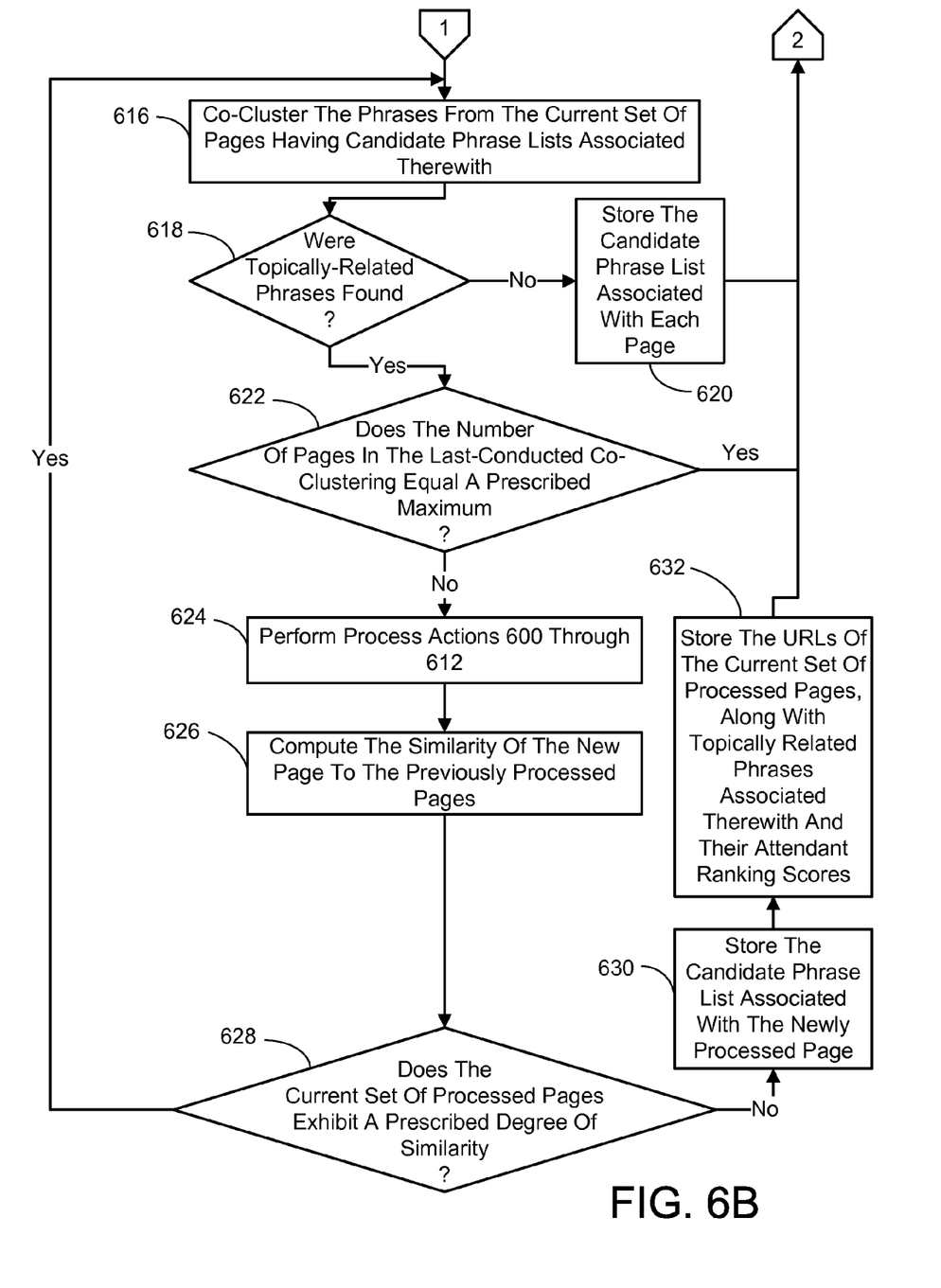

The foregoing features of the browsing sequence phrase identification technique can be embodied in the following process. Referring to FIGS. 6A-B, in one implementation, the process begins by selecting a previously unselected acceptable page in the user's browsing sequence in chronological order (600). This could be the current page being viewed if the user's browsing sequence is being processed in real-time, or it can be from a stored browsing history. It is noted that for the purposes of this selecting action, a page is deemed acceptable unless it has been identified by the user as secured. If a page is deemed unacceptable, it is skipped and the next page acceptable page in the sequence is selected. If there are no acceptable pages found, the process ends (634).

Next, content elements are identified in the selected page (602) and it is determined if the number or types of content elements are insufficient to classify the page as a content page (604). If the selected page is not classifiable as a content page, in this implementation it is eliminated from further consideration (606). Process actions 600-606 are then repeated as appropriate until an acceptable page is found.

When an acceptable page is found, the identified content elements are scanned to identify all phrases of two or more words (or some other length phrase if desired) that are also found in a prescribed phrase list (608). The identified phrases are then designated as candidate phrases and form a candidate phrase list (610). In addition, each word in each candidate phrase associated with the selected page is replaced with its stem word (612).

The foregoing process to produce a candidate phrase list for a page is repeated on subsequent acceptable pages in the browsing sequence until a minimum number of pages have candidate phrase lists associated therewith. More particularly, it is next determined if the minimum number of pages have candidate phrase lists associated with them (614). If not, process actions 600 through 614 are repeated as appropriate until the minimum number of pages are obtained.

Once the minimum number of pages has been obtained and each has a list of candidate phrases associated therewith, a co-clustering procedure is performed on the set of pages (616). It is then determined if topically-related phrases were found in the co-clustered phrases from the set of pages (618). If no topically-related phrases are found in the set of pages considered in the co-clustering, then the candidate phrase list associated with each page is stored for possible future reference (620), and process actions 600 through 620 are repeated starting with the next previously unselected page in the browsing sequence. As such, a new iteration is started and the previously processed pages are ignored. If, however, topically-related phrases are found in the set of pages considered in the co-clustering, it is determined if the number of pages involved in the last-conducted co-clustering procedure equaled a prescribed maximum number of pages (622). For example, the prescribed maximum number of pages could be 10-12 pages. If the number of pages involved in the last-conducted co-clustering procedure equals the prescribed maximum number of pages, then process actions 600 through 622 are repeated as appropriate, starting with the next previously unselected page in the browsing sequence, and the previously processed pages are ignored in the new iteration. However, if the number of pages involved in the last-conducted co-clustering procedure was less than the prescribed maximum number of pages, the next acceptable page in the browsing sequence is selected and processed to produce a candidate phrase list for the newly selected page by performing process actions 600 through 612 (624). Then, the similarity of the new page to the previously processed pages (which in this implementation are all the pages in the current iteration that have candidate phrase lists associated therewith) is computed (626) and it is determined if the pages exhibit a prescribed degree of similarity (628). In one implementation, the similarity of the processed pages is determined using the aforementioned cosine similarity procedure, and the degree of similarity is assessed by determining if a resulting similarity value is less than a prescribed similarity threshold. If the prescribed degree of similarity is not found, then the candidate phrase list associated with the newly processed page is stored (630). In addition, the URLs of the aforementioned previously-processed pages are stored, along with topically related phrases associated therewith and their attendant ranking scores (632). Process actions 600 through 634 are then repeated as appropriate, starting with the next previously unselected acceptable page in the browsing sequence. On the other hand, if the prescribed degree of similarity is found, then process actions 616 through 634 are repeated as appropriate.

1.6 Page Tagging

Figure 7A:
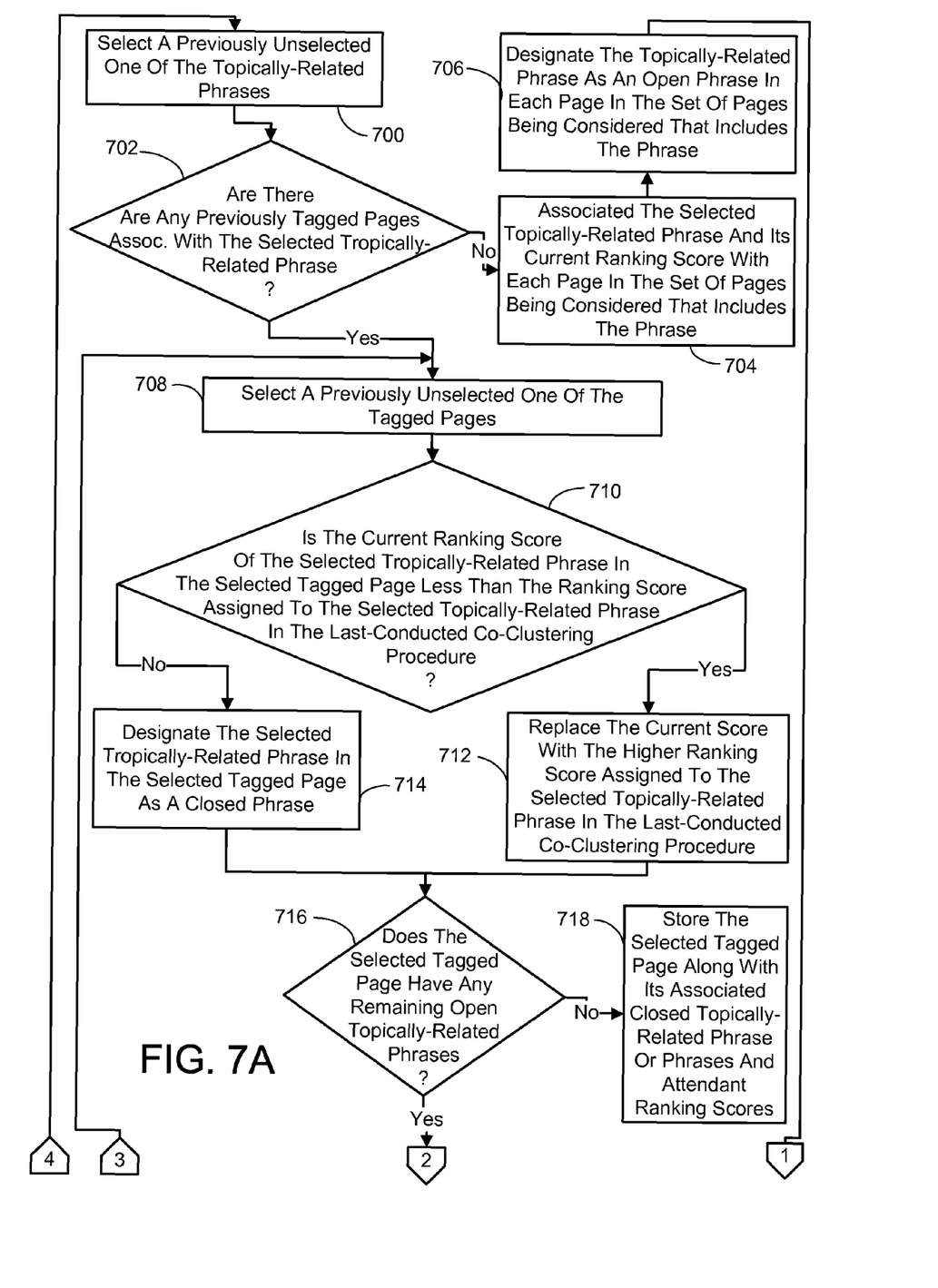
FIGS. 7A-B are a continuing flow diagram generally outlining one embodiment of a page tagging process that can be employed with the process of FIGS. 6A-B.
Figure 7B:
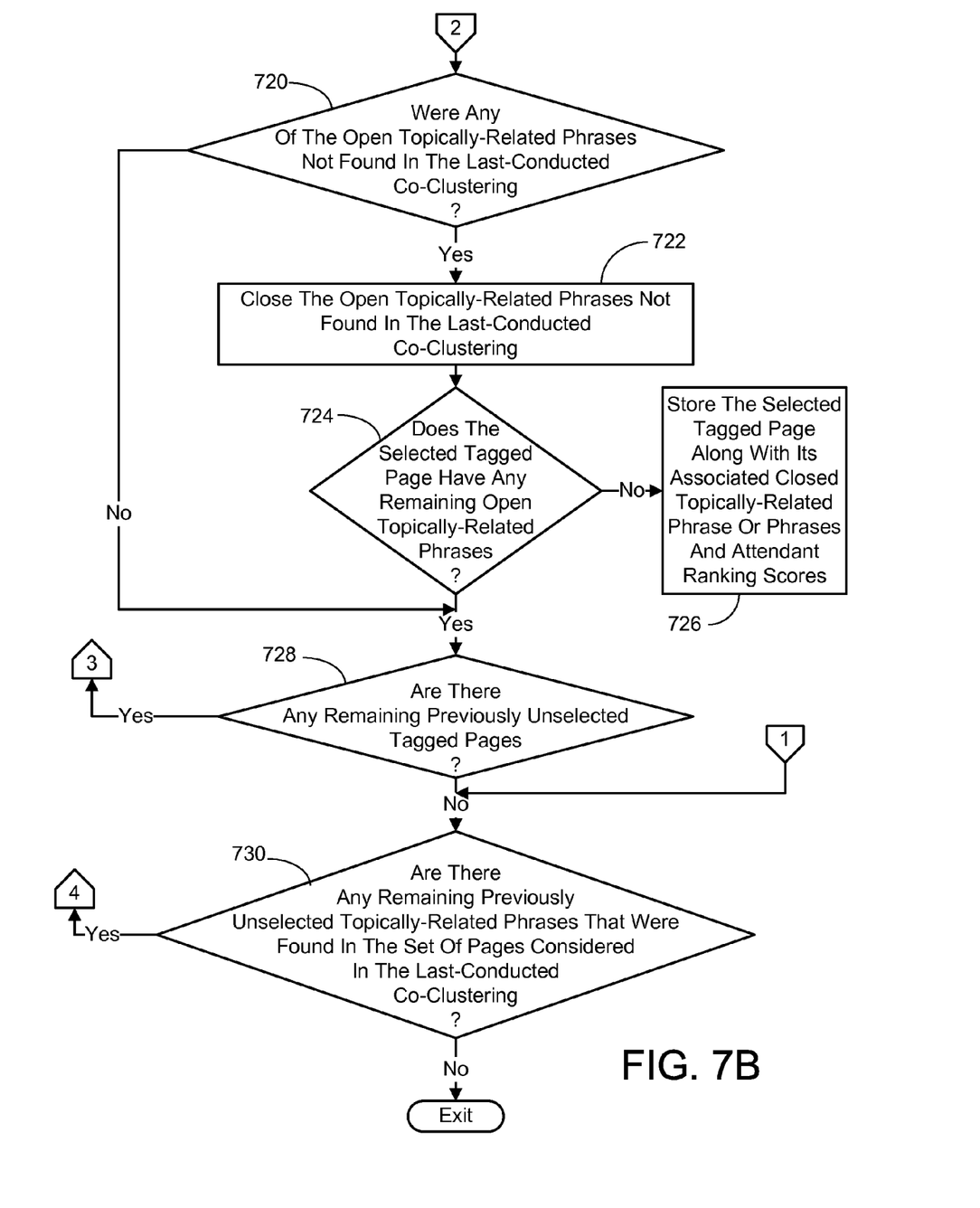

It is noted that the process for the browsing sequence phrase identification technique can be made more efficient by reducing the number of pages processed in subsequent iterations when topically-related phrases are found in the set of pages considered in the last-conducted co-clustering procedure. In one implementation, this is accomplished as follows. Referring to FIGS. 7A-B, a previously unselected one of the topically-related phrases is selected (700). It is then determined if there are any previously tagged pages (702), where a tagged page is defined as one where the selected topically-related phrase and its ranking score has been associated therewith, and currently has an open designation (as will be described shortly). If there are no tagged pages found, then the selected topically-related phrase and its current ranking score are associated with each page in the set of pages being considered that includes the phrase (704). In addition, the topically-related phrase is designated as an open phrase in each page in the set of pages being considered that includes the phrase (706).

If, however, one or more tagged pages is found, a previously unselected one of these tagged pages is selected (708), and it is determined if the current ranking score of the selected tropically-related phrase in the selected tagged page is less than the ranking score assigned to the selected topically-related phrase in the last-conducted co-clustering procedure (710). If the current ranking score of the selected tropically-related phrase in the selected tagged page is less, then the current score is replaced with the higher ranking score assigned to the selected topically-related phrase in the last-conducted co-clustering procedure (712). If, however, the current ranking score of the selected tropically-related phrase in the selected tagged page is not less than the ranking score assigned to the selected topically-related phrase in the last-conducted co-clustering procedure, then the phrase is designated as a closed phrase in the selected tagged page (714). It is then determined if the selected tagged page has any remaining open topically-related phrases associated therewith (716). If not, then the page URL is stored along with its associated closed topically-related phrase or phrases and attendant ranking scores (718). If the selected tagged page does have open topically-related phrases, then it is determined if any of these open topically-related phrases were not found in the last-conducted co-clustering procedure (720), and any such phrases are designated as closed phrases (722). It is then again determined if the selected tagged page has any remaining open topically-related phrases associated therewith (724). If not, then the page URL is stored along with its associated closed topically-related phrase or phrases and attendant ranking scores (726). Otherwise, the tagged page process continues by determining if there are any remaining previously unselected tagged pages (728) and repeating process actions 708 through 728 as appropriate until all of the tagged pages have been processed. It is next determined if there are any previously unselected topically-related phrases that were found in the set of pages considered in the last-conducted co-clustering (730). If so, process actions 700 through 730 are repeated as appropriate until all these topically-related phrases have been processed.

Once all the topically-related phrases that were found in the set of pages considered in the last-conducted co-clustering have been processed as described above, it is determined if there are any tagged pages associated with a topically-related phrase that have one or more tropically-related phrases still designated as open phrases. This information is then used to streamline the process. For example, if the foregoing tagged page feature were implemented in the exemplary process outlined in FIGS. 6A-B, and it was determined that there are not any tagged pages associated with a topically-related phrase that have one or more tropically-related phrases still designated as open phrases, then the process of FIGS. 6A-B starting with process action 600 is rerun, beginning with the next previously unselected page in the browsing sequence. If, however, there are tagged pages associated with a topically-related phrase that have one or more tropically-related phrases still designated as open phrases, then the process of FIGS. 6A-B starting with process action 622 is repeated, except that instead of processing all the pages in the current iteration having candidate phrase lists associated therewith, only pages still having one or more open topically-related phrases are considered.

1.7 Re-Ranking Based on User Browsing Patterns

When no more acceptable pages can be found in the browsing sequence, the ranking scores associated with the topically-related phrases of the pages having such phrases can optionally be re-ranked. In one implementation this re-ranking is based on a user's browsing history pattern. For example, this re-ranking can involve, for each stored page, multiplying the ranking score of each topically-related phrase by the inverse-log of the frequency that the topically-related phrase under consideration occurs across all the stored pages in the user's browsing history. However, it is noted that the re-ranking procedure is not limited to using the user's browsing history as a basis for the re-ranking. Other bases could be employed as well. For instance, explicit user interaction such as when the user specifies that a particular keyword is always important, no matter how often it occurs in the browsing history, could provide the basis or a portion thereof for re-ranking the topically-related phrases.

Re-ranking the ranking scores in the foregoing manner personalizes them to the user by ranking phrases associated with topics the user finds important (as evidenced by their frequency in the browsing history) higher than they may have been before the re-ranking.

1.8 Providing Results

It is noted that the foregoing process can result in a substantial number of topically-related phrases being associated with a page. In view of this, in one implementation, for each page having multiple topically-related phrases associated therewith it is determined if the number of phrases exceeds a prescribed number. If so, the top ranking topically-related phrases (based on their attendant ranking scores) up to the aforementioned prescribed number are identified. When the topically-related phrases for a page are provided to a user in this implementation, only the identified top ranking phrases are presented.

2.0 The Computing Environment

A brief, general description of a suitable computing environment in which portions of the browsing sequence phrase identification technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 8:
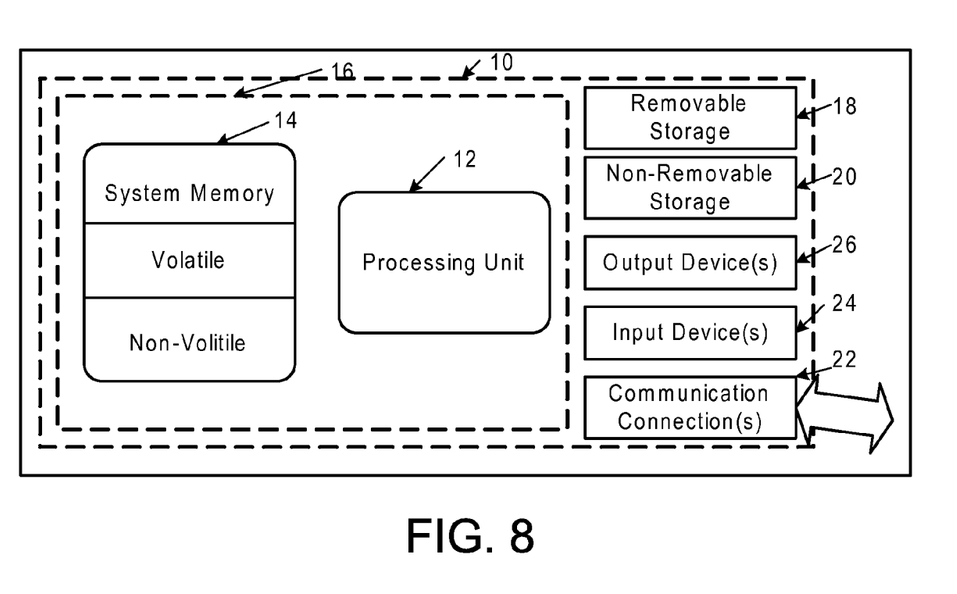
FIG. 8 is a diagram depicting a general purpose computing device constituting an exemplary system for implementing browsing sequence phrase identification technique embodiments described herein.

FIG. 8 illustrates an example of a suitable computing system environment. The computing system environment is only one example of a suitable computing environment and is not intended to suggest any limitation as to the scope of use or functionality of browsing sequence phrase identification technique embodiments described herein. Neither should the computing environment be interpreted as having any dependency or requirement relating to any one or combination of components illustrated in the exemplary operating environment. With reference to FIG. 8, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 8 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 8 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The browsing sequence phrase identification technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for identifying topically-related phrases in a browsing sequence, comprising:
using a computer to perform the following process actions:
for each iteration of said process,
scanning content elements in each of a number of acceptable pages in a user's browsing sequence in chronological order starting with the earliest acceptable page found in the sequence to identify each phrase of at least a prescribed minimum number of words that is also present in a prescribed phrase list, wherein a page is acceptable if it has not been designated as secured, and wherein the number of acceptable pages scanned equals the number that produces a minimum number of pages having at least one of said identified phrases found therein,
for each of said pages having at least one of said identified phrases found therein, designating each identified phrase as a candidate phrase to establish a candidate phrase list for the page,
co-clustering the phrases found on the pages having a candidate phrase list associated therewith that was established in a current iteration of said process to produce a set of one or more topically-related phrases and a ranking score for each topically-related phrase, if any topically-related phrases are found,
whenever said set of one or more topically-related phrases and a ranking score for each topically-related phrase is produced, scanning content elements in each acceptable page in a user's browsing sequence in chronological order starting with the earliest previously-unscanned acceptable page until a candidate page having at least one phrase of at least a prescribed minimum number of words that is also present in a prescribed phrase list is found and designating each identified phrase therein as a candidate phrase to establish a candidate phrase list for the candidate page, and then repeating the co-clustering and second scanning actions until no topically-related phrases are found in the last-conducted co-clustering procedure or the number of pages involved in the last-conducted co-clustering procedure equals a prescribed maximum number of pages, and
whenever no topically-related phrases are found in the last-conducted co-clustering procedure, or the number of pages involved in the last-conducted co-clustering procedure equaled the prescribed maximum number of pages, starting a new iteration of said process starting in chronological order with the next previously-unscanned acceptable page in the user's browsing sequence.

2. The process of claim 1, wherein prior to repeating the co-clustering and second scanning actions until no topically-related phrases are found in the last-conducted co-clustering procedure or the number of pages involved in the last-conducted co-clustering procedure equals a prescribed maximum number of pages whenever said set of one or more topically-related phrases and a ranking score for each topically-related phrase is produced, the process further comprises:
computing a measure of similarity of the last-discovered candidate page to pages previously processed in the current iteration of said process that have candidate phrase lists associated therewith;
determining if the measure of similarity computed indicates a prescribed degree of similarity;
whenever the measure of similarity computed does not indicate the prescribed degree of similarity, storing the topically-related phrase or phrases associated with pages previously processed in the current iteration of said process that have candidate phrase lists associated therewith and their attendant ranking scores, and starting a new iteration of said process starting in chronological order with the next previously-unscanned acceptable page in the user's browsing sequence; and
whenever the measure of similarity computed does indicate the prescribed degree of similarity, repeating said co-clustering and second scanning actions, along with the similarity measure computing and determining actions, until no topically-related phrases are found in the last-conducted co-clustering procedure or the number of pages involved in the last-conducted co-clustering procedure equals a prescribed maximum number of pages.

3. The process of claim 2, wherein the process actions of starting a new iteration of said process are performed until no more acceptable pages can be found in the browsing sequence, and whenever no more acceptable pages can be found in the browsing sequence, performing a process action of re-ranking the ranking scores associated with the stored topically-related phrases.

4. The process of claim 3, wherein the action of re-ranking the ranking scores associated with the stored topically-related phrases, comprises an action of multiplying the ranking score of each topically-related phrase by the inverse-log of the frequency that the topically-related phrase occurs across all the acceptable pages of the browsing sequence.

5. The process of claim 1, wherein the process actions of starting a new iteration of said process are performed until no more acceptable pages can be found in the browsing sequence, and whenever no more acceptable pages can be found in the browsing sequence, performing a process action of, for each page in the browsing sequence having topically-related phrases associated therewith, designating a prescribed number of the top ranking topically-related phrases based on their attendant ranking scores as the topically-related phrases associated with the page.

6. The process of claim 1, wherein the minimum number of pages having at least one of said identified phrases found therein is computed, said computing comprising the following process actions:
(a) determining if a predefined number of pages having at least one of said identified phrases found therein have been identified;
(b) whenever it is determined the predefined number of pages have been identified, computing the similarity of these pages and determining if the pages exhibit a prescribed degree of similarity;
(c) whenever the pages exhibit a prescribed degree of similarity, designating the pages as the minimum number of pages;
(d) whenever the pages do not exhibit a prescribed degree of similarity, replacing the first page with the next acceptable page in the browsing sequence, and repeating actions (a) through (d) as appropriate until the minimum number of pages is designated.

7. The process of claim 6, wherein the process action of computing the similarity of the pages and determining if the pages exhibit a prescribed degree of similarity, comprises the actions of:
computing the similarity of the pages using cosine similarity procedure; and
deeming that the pages exhibit the prescribed degree of similarity if a similarity value computed in the cosine similarity procedure is equal to or more than a prescribed similarity threshold.

8. A computer-implemented process for identifying topically-related phrases in a browsing sequence, comprising:
using a computer to perform the following process actions:
(a) selecting a previously unselected acceptable page in a user's browsing sequence in chronological order starting with the earliest acceptable page, wherein a page is acceptable if it has not been designated as secured;
(b) identifying content elements in the selected page;
(c) determining if the number or types of content elements identified in the selected page are not sufficient to establish the page as a content page;
(d) whenever it is determined the number or types of content elements identified in the selected page are not sufficient to establish the page as a content page, eliminating the page from further consideration and repeating actions (a)-(c) until a currently selected page is found to have the number or types of content elements sufficient to establish the page as a content page;
(e) scanning the identified content elements found in the currently selected page to identify each phrase of at least a prescribed minimum number of words that is also present in a prescribed phrase list;
(f) designating each identified phrase as a candidate phrase to establish a candidate phrase list for the selected page;
(g) determining if a minimum number of pages have candidate phrase lists associated therewith;
(h) whenever it is determined that the number of pages having candidate phrase lists associated therewith is less than said minimum number of pages, repeating actions (a)-(g) until the minimum number of pages having candidate phrase lists associated therewith are obtained;
(i) co-clustering the phrases found in the pages having a candidate phrase list associated therewith that was established in a current iteration of said process to produce a set of one or more topically-related phrases and a ranking score for each topically-related phrase, or to produce an indication that there are no topically-related phrases among the pages having a candidate phrase list associated therewith that was established in a current iteration of said process;
(j) whenever said indication that there are no topically-related phrases is produced, storing the topically-related phrase or phrases associated with pages involved in the last-conducted co-clustering and their attendant ranking scores, and starting a new iteration of said process by repeating actions (a)-(i) beginning with the next previously unselected page in the browsing sequence, unless there are no acceptable unselected pages remaining in the browsing sequence;
(k) whenever said set of one or more topically-related phrases and a ranking score for each topically-related phrase is produced, determining if the number of pages involved in the last-conducted co-clustering procedure equaled a prescribed maximum number of pages;
(l) whenever it is determined that the number of pages involved in the last-conducted co-clustering procedure equaled the prescribed maximum number of pages, starting a new iteration of said process by repeating actions (a)-(k) beginning with the next previously unselected page in the browsing sequence, unless there are no acceptable unselected pages remaining in the browsing sequence;
(m) whenever it is determined that the number of pages involved in the last-conducted co-clustering procedure was less than the prescribed maximum number of pages, producing a candidate phrase list for a newly selected acceptable page by repeating actions (a)-(f);
(n) computing a measure of similarity of the newly selected acceptable page to pages previously processed in the current iteration of said process that have candidate phrase lists associated therewith;
(o) determining if the measure of similarity computed indicates a prescribed degree of similarity;
(p) whenever the measure of similarity computed does indicate a prescribed degree of similarity, repeating actions (i)-(o);
(q) whenever the measure of similarity computed does not indicate a prescribed degree of similarity, storing the topically-related phrase or phrases associated with pages previously processed in the current iteration of said process that have candidate phrase lists associated therewith and their attendant ranking scores, and starting a new iteration of said process by repeating actions (a)-(o) starting with the next previously unselected page in the browsing sequence, unless there are no acceptable unselected pages remaining in the browsing sequence.

9. The process of claim 8, wherein the process action of designating each identified phrase as a candidate phrase to establish a candidate phrase list for the selected page, comprises an action of replacing each word in each candidate phrase associated with the selected page with its stem word.

10. The process of claim 8, further comprising an action of, whenever said indication that there are no topically-related phrases is produced, storing the candidate phrase list associated with each page considered in the co-clustering procedure.

11. The process of claim 8, further comprising an action of, whenever the measure of similarity computed does not indicate a prescribed degree of similarity, storing the candidate phrase list associated with the newly selected acceptable page.

12. The process of claim 8, wherein the process action of computing a measure of similarity of the newly selected acceptable page to pages previously processed in the current iteration of said process that have candidate phrase lists associated therewith, comprises an action of computing the measure of similarity using a cosine similarity procedure, and wherein the process action of determining if the measure of similarity computed indicates a prescribed degree of similarity, comprises an action of determining if a resulting similarity value is less than a prescribed similarity threshold.

13. The process of claim 8, wherein whenever said set of one or more topically-related phrases and a ranking score for each topically-related phrase is produced, prior to determining if the number of pages involved in the last-conducted co-clustering procedure equaled a prescribed maximum number of pages, performing the following process action:

(i) selecting a previously unselected one of the topically-related phrases;

(ii) determining if there are any previously tagged pages, wherein a tagged page is defined as one where the selected topically-related phrase and its ranking score has been associated therewith, and the selected topically-related phrase currently has an open designation;

(iii) whenever it is determined there are not any previously tagged pages, associating the selected topically-related phrase and its current ranking score with each page known to include the phrase, and designating the selected topically-related phrase as an open phrase in each page known to include the phrase;

(iv) whenever it is determined there are one or more previously tagged pages, selecting a previously unselected one of these tagged pages, and determining if the current ranking score of the selected tropically-related phrase in the selected tagged page is less than the ranking score assigned to the selected topically-related phrase in the last-conducted co-clustering procedure;

(v) whenever it is determined the current ranking score of the selected tropically-related phrase in the selected tagged page is less, replacing the current score with the higher ranking score assigned to the selected topically-related phrase in the last-conducted co-clustering procedure;

(vi) whenever it is determined the current ranking score of the selected tropically-related phrase in the selected tagged page is not less, designating the selected tropically-related phrase in the selected tagged page as a closed phrase;

(vii) determining if the selected tagged page has any remaining open topically-related phrases associated therewith;

(viii) whenever it is determined the selected tagged page does not have remaining open topically-related phrases associated therewith, storing the closed topically-related phrase or phrases and their attendant ranking scores;

(ix) whenever it is determined the selected tagged page has remaining open topically-related phrases associated therewith, determining if any of the open topically-related phrases of the selected tagged page were not found in the last-conducted co-clustering procedure and designating these phrases as closed phrases;

(x) determining if the selected tagged page has any remaining open topically-related phrases associated therewith;

(xi) whenever it is determined the selected tagged page does not have remaining open topically-related phrases associated therewith, storing the closed topically-related phrase or phrases and their attendant ranking scores;

(xii) whenever it is determined the selected tagged page has remaining open topically-related phrases associated therewith, determining if there are any remaining previously unselected tagged pages and if so repeating process actions (iv) through (xi) as appropriate until all of the tagged pages have been selected;

(xiii) determining if there are any previously unselected topically-related phrases that were found in the last-conducted co-clustering procedure and if so, repeating process actions (i) through (xii) as appropriate until all the topically-related phrases have been considered;

(xiv) determining if there is a tagged page that has at least one tropically-related phrases still designated as an open phrase;

(xv) whenever it is determined that there are no tagged pages that have at least one tropically-related phrases still designated as an open phrase, storing the topically-related phrase or phrases associated with pages processed in the current iteration of said process that have candidate phrase lists associated therewith and their attendant ranking scores, and starting a new iteration of said process by repeating actions (a)-(o) starting with the next previously unselected page in the browsing sequence, unless there are no acceptable unselected pages remaining in the browsing sequence; and (xvi) whenever it is determined that there is a tagged page that has at least one tropically-related phrases still designated as an open phrase, continuing said process starting with the process action of determining if the number of pages involved in the last-conducted co-clustering procedure equaled a prescribed maximum number of pages using only pages that have at least one tropically-related phrases still designated as an open phrase as said pages previously processed in the current iteration of said process that have candidate phrase lists associated therewith.

* * * * *